United States Patent
Steinkopf et al.

[11] Patent Number: 6,043,170
[45] Date of Patent: Mar. 28, 2000

[54] MINERAL FIBER COMPOSITION

[75] Inventors: Bernd Steinkopf, Ludwigshafen; Wolfgang Holstein, Homberg; Axel Katzschmann, Schwetzingen; Peter Lohe, Mutterstadt, all of Germany

[73] Assignee: Isover Saint-Gobain, Courbevoie, France

[21] Appl. No.: 08/944,871

[22] Filed: Oct. 6, 1997

Related U.S. Application Data

[63] Continuation of application No. PCT/EP97/00545, Feb. 6, 1997.

[30] Foreign Application Priority Data

Feb. 6, 1996 [DE] Germany .................. 196 04 238

[51] Int. Cl.⁷ .................. C03C 13/00; C03C 13/02
[52] U.S. Cl. .................. 501/36; 501/38; 501/70; 501/73
[58] Field of Search .................. 501/35, 36, 37, 501/38, 70, 73

[56] References Cited

U.S. PATENT DOCUMENTS

| | | | |
|---|---|---|---|
| 3,929,497 | 12/1975 | Clark-Monks | 501/35 |
| 4,367,012 | 1/1983 | Ikeda et al. | 501/37 |
| 4,764,487 | 8/1988 | Lewis | 501/38 |
| 5,037,470 | 8/1991 | Matzen et al. | 501/35 |
| 5,250,488 | 10/1993 | Thelohan et al. | 501/36 |
| 5,576,252 | 11/1996 | Rapp et al. | 501/35 |
| 5,691,255 | 11/1997 | Jensen et al. | 501/38 |

FOREIGN PATENT DOCUMENTS

| | | |
|---|---|---|
| 632966 | 6/1932 | Belgium . |
| 009 418 | 4/1980 | European Pat. Off. . |
| 9418 | 4/1980 | European Pat. Off. . |
| 583 791 | 2/1994 | European Pat. Off. . |
| 2662687 | 12/1991 | France . |
| 496341 | 8/1956 | Italy . |
| 160196 | 4/1991 | Poland . |
| 1724613 A1 | 4/1992 | U.S.S.R. . |
| 811243 | 4/1959 | United Kingdom . |
| 2034300 | 6/1980 | United Kingdom . |
| 83 01947 | 6/1983 | WIPO . |
| WO 93/22251 | 11/1993 | WIPO . |
| 96/14274 | 5/1996 | WIPO . |

*Primary Examiner*—Michael Marcheschi
*Attorney, Agent, or Firm*—Pillsbury Madison & Sutro LLP

[57] ABSTRACT

Mineral fiber composition which is decomposable in the physiological medium, characterized by the following constituents in weight percent: $SiO_2$ 30 to less than 51; $Al_2O_3$ higher than 11.5, in particular higher than 13, up to 25; CaO 2 to less than 23; MgO 0 to 15; $Na_2O+K_2O$ higher than 10, up to 19; $TiO_2+Fe_2O_3$ 6 to 18; various 0 to 3.

5 Claims, No Drawings

MINERAL FIBER COMPOSITION

This is a Continuation of International Appln. No. PCT/EP97/00545 filed Feb. 6, 1997 which designated the U.S.

The present invention relates to a mineral fiber composition which is highly decomposable in the physiological medium.

The prior art describes several mineral fiber compositions which are specified to be decomposable in a physiological environment.

Physiological decomposition of mineral fiber compositions is of great significance inasmuch as various investigations point out that certain mineral fibers having very small diameters in the range of less than 3 μm are suspected of being carcinogenic, whereas mineral fibers of such dimensions which are physiologically well decomposable do not show any carcinogenicity.

The mineral fiber compositions do, however, also have to have good processing properties with known methods for manufacturing small-diameter mineral wool, in particular the blast drawing method. This means particularly a sufficient processing range of e.g. 80° C. and suitable viscosity of the molten material.

In addition, the mechanical and thermal properties of the mineral fibers and of the respective products produced therefrom are of decisive importance. Mineral fibers are for instance utilised in a large scope for insulation purposes. Especially for utilisation in the industrial sector and for fire protection elements, the mineral fibers need to have sufficient heat stability.

It is the object of the invention to create a new mineral fiber composition which is distinguished by a high degree of physiological decomposability, shows good heat stability, has good processing properties, and can be produced economically.

The invention is based on the insight that this object may be achieved by specific mineral fiber compositions made up of silicon dioxide and alkaline earth oxides, and furthermore have a relatively high content of sodium oxide and/or potassium oxide and a substantial content of alumina as well as titanium oxide and/or iron oxide.

It was found that such mineral fiber compositions satisfy the combination of required properties, as there are a high degree of physiological decomposability, sufficient heat stability for insulation purposes in the industrial sector, and good processing properties in manufacturing the mineral wool proper and the products. This also includes the condition that the upper devitrification temperature of the molten material is preferably lower than 1,300° C. The mean fiber diameter is preferably 4 to 5 μm or less.

The subject matter of the invention is a mineral fiber composition which has a high degree of decomposability in the physiological medium and which is characterised by the following constituents in weight per cent:

| | |
|---|---|
| $SiO_2$ | 30 to less than 51 |
| $Al_2O_3$ | higher than 11.5; in particular higher than 13, up to 25 |
| CaO | 2 to less than 23 |
| MgO | 0 to 15 |
| $Na_2O + K_2O$ | higher than 10 to 19 |
| $TiO_2 + Fe_2O_3$ | 6 to 18 |
| Various | 0 to 3 |

What is referred to by $Fe_2O_3$ in this context are the contents of $Fe_2O_3$ and of FeO (expressed as $Fe_2O_3$).

In preferred embodiments of the invention, the $Al_2O_3$ content is around 14.2% (wt.), 14.5% (wt.) or 17.1% (wt.) as concentration values, or as minimum values of the concentration range up to 25% (wt.).

The concentration of $Na_2O+K_2O$ preferably amounts to 10.4% (wt.) or 12% (wt.) as concentration values, or as minimum values of the concentration range up to 19% (wt.).

The mineral fiber compositions of the invention in particular can be well attenuated by the blast drawing method, which means that a mineral wool having good fineness and a low bead content is obtained.

Such mineral fibers attain high heat stability and may also be used for fire protection structures having a resistance rating of at least 90 minutes which was determined in the so-called small-flame furnace according to DIN (German Industrial Standard) 4102, Part 17. Furthermore the limit temperatures of application as determined according to AGQ 132 for the industrial sector are higher than 600° C.

Although the relatively high proportion of sodium oxide and/or potassium oxide results in a lowered melting point and thus in better processing properties in the melting and fiberising processes, the wool nevertheless surprisingly has a high heat stability.

For obtaining the above specified properties, it is advantageous that the contents of alkali oxides and alumina have a molar ratio of

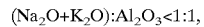

$(Na_2O+K_2O):Al_2O_3 < 1:1,$ preferably a molar ratio of 1:1.

This molar ratio roughly corresponds to a weight proportion of alkali oxides and alumina of ≦0.7:1.

The mineral fiber compositions according to the invention preferably may be melted in melting tubs fired by fossile fuels, in particular natural gas, at melting temperatures of 1,350 to 1450° C. Such melting tubs are suited for obtaining a homogeneous molten material, which is a precondition for consistent product quality. Homogeneity of the molten glass material also facilitates reproduceability of the fiberisation process and thus of the thermal and mechanical product properties. Moreover the chemical composition of the mineral wool thus produced results in a consistently high degree of physiological decomposability.

In particular the addition of alumina, titanium oxide and iron oxide increases the heat stability of the mineral wool.

Preferably the mineral fiber compositions of the invention have the following constituents in weight per cent:

| | |
|---|---|
| $SiO_2$ | 30 to less than 47 |
| $Al_2O_3$ | higher than 11.5; in particular higher than 13, up to 24 |
| CaO | 4 to 20 |
| MgO | 0 to 15 |
| $Na_2O + K_2O$ | higher than 10, up to 18 |
| $TiO_2 + Fe_2O_3$ | 7 to 16 |
| Various | 0 to 2 |

In particular the mineral fiber compositions of the invention include the following constituents in weight per cent:

| | |
|---|---|
| $SiO_2$ | 35 to 45 |
| $Al_2O_3$ | higher than 12, up to 20 |
| CaO | 8 to 17.5 |
| MgO | 2 to 10 |
| $Na_2O + K_2O$ | higher than 10, up to 16 |
| $TiO_2 + Fe_2O_3$ | 7 to 15 |
| Various | 0 to 2 |

The aluminum content of the composition is preferably between 13 and 20% (wt.).

The physiological decomposability of mineral fibers was determined in animal, i.e. in-vivo experiments by the so-called intratracheal test. Herefor the fibers to be tested were injected via the trachea into the bronchial system of the lungs of test animals (rats) by means of one or several injections. In rats as well as in human beings, particles which have penetrated into the lungs are decomposed physiologically by various defense mechanisms, e.g. macrophages, or chemical attack by lung fluid. At predetermined points of time, as a rule 35 animals are killed and the number of fibers, i.e. of non-decomposed fibers, inside the lungs is determined.

This serves to determine how quickly the fibers are decomposed inside the lungs. Based on the development over time and by approved mathematical methods, one determines the half-life period of the fiber, i.e. the time period in which 50% of the fibers inside the lungs are decomposed. A lower half-life corresponds to a higher degree of physiological decomposability of the fiber. Thus the so-called Bayer B-01 fiber has a mean half-life of 32 days in the intratracheal test.

In analogy with this B-01 mineral fiber, other mineral fibers were examined as well, which had half-life values in a range of less than 50 days and were rated to be non-carcinogenic.

The physiological decomposability of the mineral fibers according to the invention even reached values which were clearly lower than 50 days, in particular a half-life of less than 40 days. These values rule out carcinogenicity.

The temperature behavior of the mineral fibers was determined in a small-flame furnace as specified by DIN 4102, Part 17, Determination of limit temperature of application.

The invention shall be described in more detail below by reference to exemplary embodiments.

EXAMPLE 1

A mineral wool having the following composition in weight per cent was produced.

| | |
|---|---|
| $SiO_2$ | 41.3 |
| $Al_2O_3$ | 18.4 |
| CaO | 15.0 |
| MgO | 7.6 |
| $Na_2O$ | 9.5 |
| $K_2O$ | 1.3 |
| $TiO_2$ | 1.1 |
| $Fe_2O_3$ | 5.6 |

By using the blast drawing method and at an attenuating temperature between 1,300 and 1,400° C., this composition could readily be processed into mineral fibers having a mean diameter of 4.5 μm.

The wool met the conditions for the melting point test at 1,000° C.

EXAMPLE 2

A mineral wool having the following composition in weight per cent was produced:

| | |
|---|---|
| $SiO_2$ | 39.3 |
| $Al_2O_3$ | 18.3 |
| CaO | 18.4 |
| MgO | 6.6 |
| $Na_2O$ | 4.5 |
| $K_2O$ | 6.2 |
| $TiO_2$ | 0.4 |
| $Fe_2O_3$ | 6.1 |

By using the blast drawing method and at an attenuating temperature between 1,300 and 1,400° C., this composition could readily be processed into mineral fibers having a mean diameter of 4.5 to 5 μm.

EXAMPLE 3

A mineral wool having the following composition in weight per cent was produced:

| | |
|---|---|
| $SiO_2$ | 44.0 |
| $Al_2O_3$ | 18.5 |
| CaO | 13.0 |
| MgO | 5.2 |
| $Na_2O$ | 6.6 |
| $K_2O$ | 5.9 |
| $TiO_2$ | 0.4 |
| $Fe_2O_3$ | 6.2 |

By using the blast drawing method and at an attenuating temperature between 1,300 and 1,400° C., this composition could also readily be processed into mineral fibers having a mean diameter of 5.5 μm.

EXAMPLE 4

A mineral wool having the following composition in weight per cent was produced:

| | |
|---|---|
| $SiO_2$ | 37.4 |
| $Al_2O_3$ | 22.2 |
| CaO | 17.2 |
| MgO | 5.7 |
| $Na_2O$ | 4.5 |
| $K_2O$ | 6.2 |
| $TiO_2$ | 0.5 |
| $Fe_2O_3$ | 6.1 |

EXAMPLE 5

A mineral wool having the following composition in weight per cent was produced:

| | |
|---|---|
| $SiO_2$ | 43.9 |
| $Al_2O_3$ | 15.2 |
| CaO | 17.4 |
| MgO | 6.6 |
| $Na_2O$ | 4.5 |
| $K_2O$ | 6.2 |
| $TiO_2$ | 0.2 |
| $Fe_2O_3$ | 6.0 |

EXAMPLE 6

A mineral wool having the following composition in weight per cent was produced:

|       |      |
|-------|------|
| $SiO_2$ | 42.6 |
| $Al_2O_3$ | 17.9 |
| CaO | 15.0 |
| MgO | 7.3 |
| $Na_2O$ | 4.4 |
| $K_2O$ | 6.1 |
| $TiO_2$ | 0.4 |
| $Fe_2O_3$ | 6.3 |

We claim:

1. A mineral fiber composition comprising in weight per cent:

|       |      |
|-------|------|
| $SiO_2$ | 30 to <47 |
| $Al_2O_3$ | >13 to ≦24 |
| CaO | 4 to 20 |
| MgO | 0 to 15 |
| $Na_2O + K_2O$ | >10 to ≦18 |
| $TiO_2 + Fe_2O_3$ | 7 to 16 | wherein $K_2O$ is greater than 1.5 weight per cent, $Na_2O$ is not less than 4.4 weight per cent, and
wherein said mineral fiber composition decomposes in vivo after introduction into animals or humans.

2. A mineral fiber composition according to claim 1 comprising in weight per cent:

|       |      |
|-------|------|
| $SiO_2$ | 35 to 45 |
| $Al_2O_3$ | >14 to ≦20 |
| CaO | 8 to 17.5 |
| MgO | 2 to 10 |
| $Na_2O + K_2O$ | >10 to ≦16 |
| $TiO_2 + Fe_2O_3$ | 7 to 15 | wherein $K_2O$ is greater than 1.5 weight per cent, $Na_2O$ is not less than 4.4 weight per cent, and
wherein said mineral fiber composition decomposes in vivo after introduction into animals or humans.

3. The mineral fiber composition according to claim 1, wherein $Al_2O_3$ is from 17.1 to ≦24 weight per cent.

4. The mineral fiber composition according to claim 1, wherein $Na_2O+K_2O$ is from 12 to ≦18 weight per cent.

5. The mineral fiber composition according to claim 1 or claim 2, wherein the fiber composition has a lung half-life of less than 50 days.

* * * * *